May 24, 1960  D. D. CAPPS  2,937,467
SCENTED FISHING LURES
Filed Aug. 5, 1958

DONALD D. CAPPS
INVENTOR.

BY James L. Girnau
ATT'Y

United States Patent Office 2,937,467
Patented May 24, 1960

2,937,467
SCENTED FISHING LURES
Donald D. Capps, Box 85, Lowell, Oreg.
Filed Aug. 5, 1958, Ser. No. 753,305
3 Claims. (Cl. 43—42.06)

This invention relates to improvements in fish lures of the plug type for trolling or casting.

It is the principal object of the present invention to provide the body of a fishing lure of the character described with as readily accessible but normally firmly closed receptacle in the form of a cage made of screen material or wire mesh for the retention therein of either fish bait, such as fish eggs or bits of small fish, or for the retention of any effluvial scent-producing substance or substances to augment the visual attraction of the lure.

Another object of the invention is the provision of a cage of such formation that it can be incorporated within the body of the lure at either end or intermediate the ends thereof without interfering with the inherent maneuverability of the plug as it is drawn through the water.

A further object is to provide an attractive fishing lure of simple and practical construction, efficient and effective in use, relatively inexpensive to manufacture, and otherwise well adapted for the purposes for which the same is intended.

The foregoing and other objects and advantages which will become subsequently apparent reside in the details of construction and operation as more fully hereinafter described and claimed, reference being had to the accompanying drawing forming a part hereof and in which:

Figure 1:
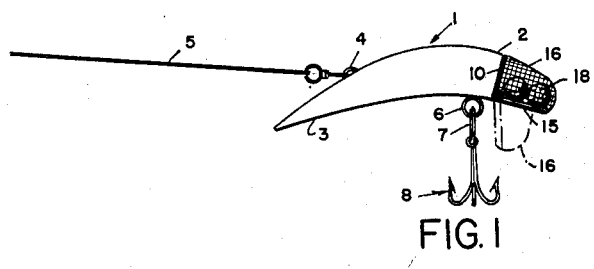
Figure 1 is a side elevational view of a fish lure made in accordance with my invention and shown attached to a trolling line.

With continuing reference to the drawing, wherein like reference characters designate like parts, reference numeral 1 indicates generally the body of the lure, which may be of various forms and made of materials of different kinds but preferably of wood for buoyancy. The body is of elongated curvilinear form, generally oval in cross-section at its rearward portion 2 and is tapered forwardly to a substantially flat portion 3, although the specific form illustrated is not critical. The top of the front portion is provided with an eye 4 by which the lure may be attached to a line 5. The bottom of the rear portion is provided with an eye 6 to which is rockably attached a cross arm 7 to whose ends are swingably attached multiple hooks 8.

Figure 2:
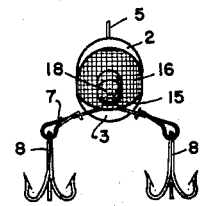
Figure 2 is a view of the right-hand end of Figure 1.
Figure 3:
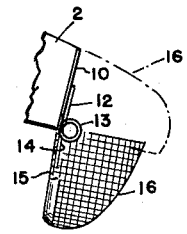
Figure 3 is a fragmentary side view on an enlarged scale showing the cage open in full lines and closed in broken lines.
Figure 4:
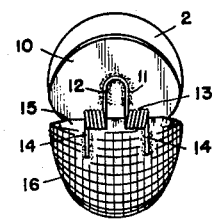
Figure 4 is a view of the right-hand end of Figure 3.

The rear end of the body 1 is provided with a flat transverse plate 10 to which is secured by soldering or the like, as at 11 (Figure 4), an intermediate section 12 of a hinge in the form of a coil spring 13 whose terminal ends 14 are similarly secured to a base plate 15 to which is also soldered a cage 16 made of screen material or other suitable wire mesh. The spring hinge 13 normally maintains the cage in a closed position as shown in full lines in Figures 1 and 2 to retain therein any type of fish bait such as fish eggs, indicated at 18, or bits of small fish or any scent-producing substance or substances capable of simulating effluvium of fish food. This feature greatly increases the effectiveness of the lure regardless of the visual attraction of its body or its movement through the water. The hinge 13 is entirely enclosed within the cage when the cage is in a closed position, and when so enclosed, the spring does not offer any parasitic resistance to the movement of the lure through the water.

The contents of the cage are protected from consumption by the fish and may be easily replaced with fresh bait by merely swinging the cage downwardly about its hinged connection 13 as above described.

Figure 5:
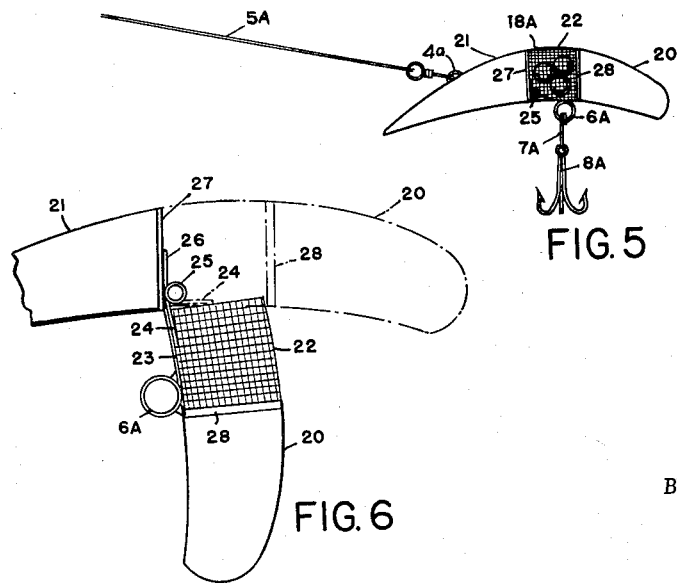
Figures 5 and 6 are views similar respectively to Figures 1 and 3 showing a modified form of the invention and with the hooks removed in Figure 6.
Figure 6:
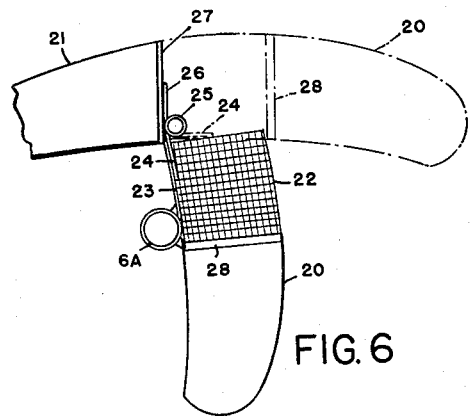

In the modified form of the invention shown in Figures 5 and 6 the body of the lure is divided into a rear section 20, forward section 21, and a center section in the form of a cage 22 made of screen material or wire mesh. The bottom of the cage is secured to a base plate 23 by soldering or the like and one end of the base plate is similarly secured to the terminal ends 24 of a hinge in the form of a coil spring 25 whose central extension 26 is soldered or otherwise secured to a flat transverse plate 27 secured to the rear end of the front section 21. The cage in cross-section matches the generally oval cross-section of the adjacent ends of the body sections. The rear end of the cage is secured to a flat transverse plate 28 which is secured to the forward end of the rear body section 20. The spring hinge 25 maintains the three body sections in their normal relationship as shown in Figure 5 with the cage contents 18A protected from consumption by the fish. Breaking the body into the position shown in full lines in Figure 6 provides easy access to the cage for replacement of its contents.

The lure is provided with spaced apart multiple hooks 8A suspended from a cross arm 7A as in the first form of the invention. The cross arm is rockably attached by an eye 6A to the underside of the base plate 23 and the spacing of the multiple hooks is such that they will clear the sides of the lure body when swung rearwardly by the reaction of the water with the lure in forward motion or when struck by a fish. It is to be noted that the line-attaching eye 4A, spring hinge 25, and the bottom eye 6A are substantially in alignment so that a rearward line of pull would be substantially coextensive with the taut fishing or trolling line 5A to thereby prevent unintentional breaking of the lure body into a cage-open position.

While I have shown particular forms of embodiment of my invention I am aware that many minor changes therein will readily suggest themselves to others skilled in the art without departing from the spirit and scope of the invention. Having thus described my invention what I claim as new and desire to protect by Letters Patent is:

1. A fish lure having an elongated body divided into a forward section terminating in a flat transverse rear end, a hollow center section of reticulated material in the form of a cage open at one of its ends and adapted for the retention of fish bait therein, and a rear section, the rear end of the center section being secured to the forward end of the rear section and permanently closed thereby, spring hinge means interconnecting the center section at its said open end with the forward section at said flat transverse end thereof and biased to normally maintain said open end of the center section in facial contact with said flat transverse end to thereby close said open end of the center section for the retention of fish bait within the center section.

2. A fish lure having an elongated body divided into a forward section terminating in a flat transverse rear end, a hollow rear section of reticulated material in the form of a cage closed at its rear end and open at its forward end and adapted for the retention of fish bait therein, the perimeter of said open forward end of the rear section matching the perimeter of said flat transverse rear end of said forward section, spring hinge means interconnecting the forward end of said rear section with said transverse rear end of the forward section, and said spring hinge means being entirely enclosed within said rear section when in a closed position, whereby the spring hinge means offers no parasitic resistance to the movement of the lure through the water.

3. A fish lure having an elongated body divided into a forward section terminating in a flat transverse rear end, a flat plate secured to and covering said transverse rear end, a hollow rear section of reticulated material in the form of a cage secured to a base plate, said cage being closed at its rear end and open at its forward end and adapted for the retention of fish bait therein, the perimeter of said open forward end of said cage matching the perimeter of said flat plate, spring hinge means secured to said base plate of the cage and to said flat plate, and said spring hinge means being entirely enclosed within said cage when the cage is in a closed position whereby the spring hinge means offers no parasitic resistance to the movement of the lure through the water.

References Cited in the file of this patent

UNITED STATES PATENTS

| | | |
|---|---|---|
| 2,008,004 | Catarau | July 16, 1935 |
| 2,598,012 | Prieur | May 27, 1952 |